Aug. 27, 1935.  R. B. CALCUTT  2,012,625
WEATHER STRIP
Filed March 11, 1935  2 Sheets-Sheet 1
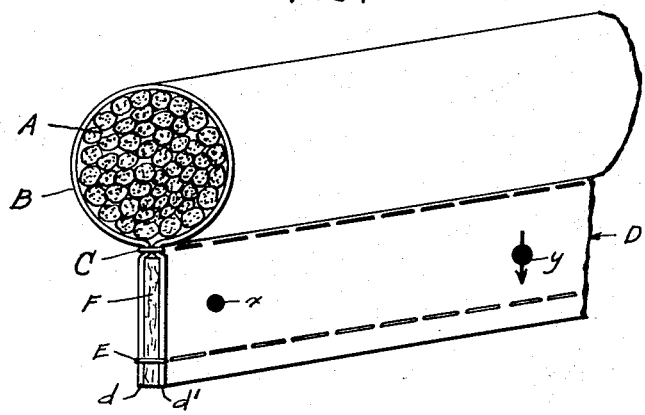
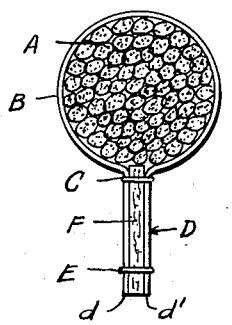 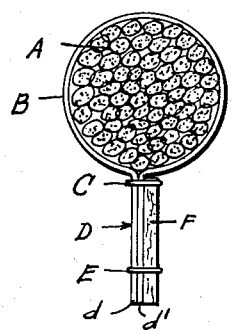 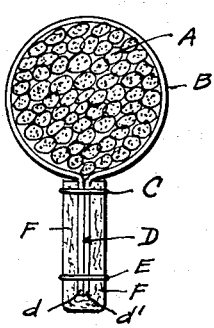
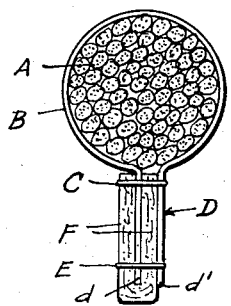 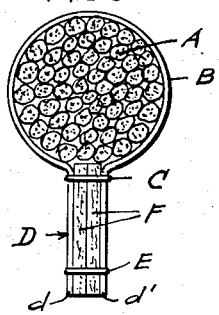
INVENTOR
REGINALD B. CALCUTT
BY E. N. Lundy
ATTY Aug. 27, 1935.  R. B. CALCUTT  2,012,625
WEATHER STRIP
Filed March 11, 1935  2 Sheets-Sheet 2

INVENTOR
REGINALD B. CALCUTT
BY E. N. Lundy
ATTY

Patented Aug. 27, 1935

2,012,625

UNITED STATES PATENT OFFICE 2,012,625

WEATHER STRIP

Reginald B. Calcutt, Chicago, Ill.

Application March 11, 1935, Serial No. 10,389

16 Claims. (Cl. 20—69)

My present invention relates to weather-strips and one of the objects thereof is to provide a flexible weather-strip that is comparatively inexpensive to manufacture, and also is neat in appearance and easy to attach. A further object of my invention is to form an attaching flange on a weather-strip that is suitably reinforced so that it will urge the cushion portion or gasket member of the weather-strip into intimate engagement with the opposing element of a door or window or the frame in which the latter is movably mounted. Such a structure will prevent sagging of the attaching flange and cushion between the nails or other devices used to mount the strip in position.

The reinforcement which is provided in the attaching flange is flexible so that it will readily conform to irregularities or unevenness on the surface upon which the strip is mounted, and because of the fact that the attaching flange is reinforced the weather-strip may be more rapidly or quickly mounted and fewer nails or tacks will be required in the process of attaching because they may be spaced farther apart.

Further objects of my invention that may be mentioned are the provision of a weather-strip that is novel in construction, is made from sturdy parts which tend for durability, is capable of being quickly fabricated or manufactured by a single operation, and is dependable in performing the functions for which it is designed.

With the foregoing and other objects in view, my invention consists of the novel construction and arrangement of parts hereinafter described and more specifically pointed out in the appended claims. Reference is made to the accompanying drawings that form a part of this specification, in which, Figure 1 is a perspective of an end portion of a weather-strip made in accordance with my invention.

The remaining figures are end views of modified forms of my invention showing a variety of ways of constructing the attaching flange with a suitable reinforcement, said figures disclosing the following details:—

Figure 2 is similar to Figure 1 except the stitching adjacent the cushion passes through the reinforcing strip.

Figure 3 shows the reinforcement material upon an outside face of the attaching flange.

Figure 4 shows the reinforcement material upon both outside faces of and surrounding the edge of the attaching flange.

Figure 5 shows the reinforcement material folded longitudinally with one longitudinal portion disposed between the two pieces of fabric holding the flange.

Figure 6 shows two strips of reinforcing material substituted for the single piece in Figure 2.

Figure 7:
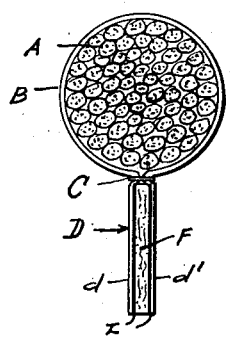
Figure 7 shows a structure similar to Figure 1 with the reinforcing strip cemented in the flange instead of being sewn.

The gasket or cushion member of the weather-strip may be of a variety of materials which is usually selected because of its cushioning characteristics and because it is cheap. In the present structure I prefer to employ a cushion made from wicking or what is commercially known as "roving" which consists of a plurality of strands of soft cotton fibers that are twisted and formed into a rope-like element or body. This cushioning material, as a body, is designated as A throughout the drawings and is characterized by the fact that it is soft and when it is slightly compacted into cylindric shape it provides an excellent cushion for engaging an opposing member to seal a space between the meeting surfaces of doors or windows and the frames in which the latter are movably mounted.

As above mentioned, the rope-like length of roving A is of cylindrical shape in cross section and in order to maintain this shape and also to slightly compress the roving I surround the latter with a covering B of a weather-proof fabric or other woven material which forms the cushion of the desired diameter. The covering fabric is a continuous length of material that surrounds the roving intermediate the longitudinal edges of the fabric strip and it is maintained in position by a row of stitches C.

The remaining edge portions of the fabric strip are arranged substantially parallel to each other to provide a mounting fin or flange, designated as a whole by D that is disposed radially to the cylindrical cushion or gasket. The outer edges of the fabric that are remote to the cushion are connected together by a second row of stitches E.

Obviously a weather strip formed in the manner above described could be utilized in the usual manner but the same is open to objection, primarily because of the fact that the plies of fabric forming the attaching fin or flange D, even though several plies are used, are nevertheless quite flimsy so that when the weather-strip is mounted the structure has a tendency to sag or bulge in the space between the nails or brads used to secure the strip in position.

In order to overcome the sagging tendency above mentioned, I strengthen the fin or flange by means of a reinforcing member F extending the entire length of the weather-strip. In Figures 1 and 2 the reinforcing strip F is interposed between the two plies d, d' of fabric forming the flange. In Figure 1 the stitching C does not pass through the reinforcing strip F, whereas in Figure 2 such stitching passes through the strip F near its edge which is adjacent the cylindrical cushion. The other or outer row of stitches E in each instance passes through the reinforcing strip F.

It is, of course, desirable that the reinforcing strip F be a material that may be flexed transversely, and for this purpose I have found that relatively thin builder's paper is well adapted for this purpose on account of its inherent qualities as well as its cheapness. When used in association with the securing flange the strip F is disposed edgewise towards the cushion so that when the weather-strip is securely mounted the flange has very little tendency to "give" in a direction or plane parallel to the surface on which the weather-strip is mounted, and there will be practically no sagging or bulging between the attaching tacks or nails.

On account of the relative stiffness of the flange D the nails or brads may be spaced much farther apart than would be required if the reinforcing strip is omitted thereby effecting a saving of quantity of these securing elements. In order that this may be visually made known to the person who is attaching the weather-strip I provide one or both outer faces of the flange D with properly spaced indicia in the form of equidistantly spaced spots or dots x extending throughout the length of the flange, and certain of these spots may be differently outlined as shown at y to indicate the footage or foot-lengths.

Furthermore, these spots may be printed in selected colors for the purpose of designating the brand of a manufacturer or the factory in which the particular type of weather-strip was made.

The elements of this weather-strip are so disposed with respect to each other that they may be readily assembled during a single operation upon a stitcher or sewing-machine having proper feed and hemming attachments, and the indicia spots above referred to may be applied from rollers or wheels between which the flange D passes after being sewn.

In lieu of the outer row of stitches, the fabric plies forming the fin or flange D may be secured or anchored to the reinforcing strip F by means of glue, cement or other adhesive z as indicated in Figure 7; and instead of disposing the reinforcing material between the fabric plies such material F may be placed upon one of the outside surfaces of the flange or fin as shown in Figure 3. It also may be desirable to use two strips of reinforcement F in connection with the flange or fin for the purpose of increasing the stiffness of said flange in the manner shown in Figure 6.

Another mode of increasing the stiffness of the flange is shown in Figures 4 and 5 wherein the stiffening material F is twice the width of that shown in the other figures and is provided with a central longitudinal fold to form a double ply thereof between which one or more of the plies of fabric are disposed so that the fin is surrounded by the reinforcing strip as shown in Figure 4, or there may be one ply inside and one ply outside as shown in Figure 5.

Figure 8:
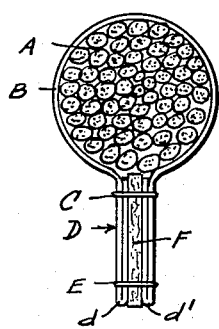
Figure 8 shows the reinforcing strip centrally located in the flange and both edges of the flange fabric folded back inside.
Figure 12:
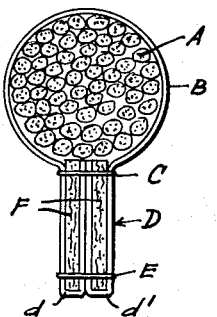
Figure 12 is a structure similar to Figure 8 showing two strips of reinforcing material each disposed between the respected folded back portions of the flange.
Figure 15:
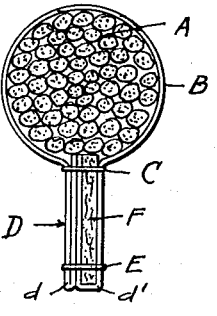
Figure 15 is a structure similar to Figure 12 with one strip of reinforcement omitted.

In Figures 8 and 12 the portion of the fabric forming the flange or fin is of greater width than in the types hereinbefore described so that each of the plies d, d' is folded back inside and towards the cushion. The reinforcing strip F is disposed between the two folded back plies in Figure 8, and in Figure 12 two strips of reinforcement F, F are disposed respectively between the outer plies and the folded-in portions of said plies, while in Fig. 15 one ply F is omitted.

Figure 9:
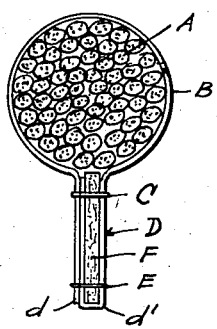
Figure 9 shows the reinforcing strip between the folded back portion of one edge of the material forming the flange.

The ply d' in Figure 9 is wider than the other ply d and it is folded back and around the reinforcing strip F and its edge portion is disposed inside or back of the other ply d.

Figure 10:
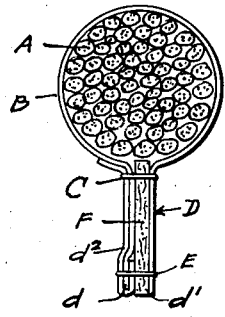
Figure 10 shows the flange formed in the manner shown in Figure 3 with a supplementary strip of material upon one side with its edge tucked under the adjacent edge of the flange material.

Figure 10 shows an arrangement of the fabric plies d, d' forming the flange similar to Figure 2, and in addition there is an extra or separate ply $d^2$ upon the outer face of the ply d with its outer edge portion folded around the adjacent outer edge of said ply and inserted under and between said ply d and the reinforcing strip F.

Figure 11:
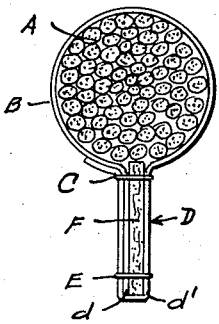
Figure 11 shows structure similar to Figure 9 except that the folded back portion of the flange material is disposed outside.
Figure 14:
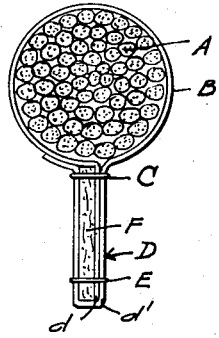
Figure 14 shows the reinforcing strip and an edge of the covering material inserted between a folded back portion formed along the other edge of the material.

In Figures 11 and 14 the fabric ply d' is wider than the other ply d and extends around the outer edge of the reinforcing strip F and inward towards the cushion which it overlaps slightly. The ply d is positioned between the reinforcing strip F and the other ply but is upon different sides of the strip in the respective figures.

Figure 13:
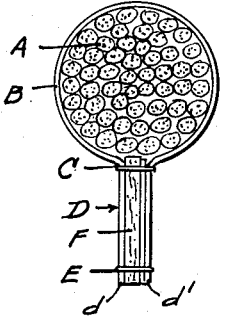
Figure 13 shows a structure similar to Figure 8 except that one of the folded back portions is omitted in the flange.

Figure 13 shows a structure generally similar to Figure 8 with the exception that the ply d does not have the folded in extension, while the ply d' has its edge portion folded back inside the fin, and the reinforcing strip F is placed between this folded in portion and the other ply d.

From the foregoing it will be apparent that I have provided a weather-strip having a soft, pliable cushion for engagement with an opposing member and having an attaching flange that is stiffened against lateral movement away from the member engaged by the cushion in normal use.

The stiffening of the flange is accomplished in a manner that does not increase the cost of manufacture to any noticeable extent because of the fact that it is merely a narrow strip of comparatively thin builders paper. The efficiency of the reinforcing or stiffening material depends to a large extent upon the edgewise disposition of the paper strip with respect to the cushion which prevents lateral distortion thereof away from the member engaged by the cushion, and it also avoids sagging or bulging of the weather-strip between the attaching nails. Although the weather-strip is effective in performing the above mentioned functions while in use, it nevertheless is quite flexible in a direction transverse to its length so that continuous lengths thereof may be wound upon spools or reels when it leaves the assembling machine so that a large quantity may be conveniently stored in a very small space and may be readily dispensed whenever desired.

It will be understood that the row of stitches C may pass through the plies of fabric in a plane beyond the adjacent inner edge of the reinforcement ply as shown in Figs. 1 and 7, or such stitches C may be inserted through such reinforcement as shown in other figures. Also, it is obvious that in structures similar to Figs. 4, 11, 12 and 14 the outer row of stitches E may be omitted if desired.

What I claim is:—

1. A weather-strip comprising a length of relatively soft material of cylindrical cross-section to provide a cushion, a length of fabric having the portion intermediate its width surrounding said cushion, securing means passing through the fabric adjacent the cushion, the edges of said fabric extending laterally from the cushion forming a normally flexible multiple-ply mounting flange, and a relatively narrow stiffening strip united to said flange and disposed edgewise towards the cushion whereby the weather-strip is stiffened radially to the cushion and in a direction towards a member contacted by the cushion, said stiffening-strip consisting of a body of material having substantial rigidity to withstand edgewise pressure.

2. A weather-strip comprising a length of relatively soft material of cylindrical cross-section to provide a cushion, a length of fabric having the portion intermediate its width surrounding said cushion, securing means passing through the fabric adjacent the cushion, the edges of said fabric extending laterally from the cushion forming a normally flexible multiple-ply mounting flange, a relatively narrow stiffening strip forming a ply of said flange, and means adjacent the outer edge of the flange securing the plies together, whereby the weather-strip is stiffened radially to the cushion and in a direction towards a member contacted by the cushion, said stiffening-strip consisting of a body of material having substantial rigidity to withstand edgewise pressure.

3. A weather-strip comprising a length of relatively soft material of cylindrical cross-section to provide a cushion, a length of fabric having the portion intermediate its width surrounding said cushion, securing means passing through the fabric adjacent the cushion, the edges of said fabric extending laterally from the cushion forming a normally flexible multiple-ply mounting flange, a relatively narrow stiffening strip forming a ply of said flange, and securing means passing through the various plies of the flange adjacent the outer edge of the latter, whereby the weather-strip is stiffened radially to the cushion and in a direction towards a member contacted by the cushion, said stiffening-strip consisting of a body of material having substantial rigidity to withstand edgewise pressure.

4. A weather-strip comprising a length of relatively soft material of cylindrical cross-section to provide a cushion, a length of fabric having the portion intermediate its width surrounding said cushion, a row of stitches passing through the fabric adjacent the cushion, the edges of said fabric extending laterally from the cushion forming a normally flexible multiple-ply mounting flange, a relatively narrow stiffening strip forming a ply of said flange, and a row of stitches passing through all the plies of the flange adjacent the outer edge of the latter, whereby the weather-strip is stiffened radially to the cushion and in a direction towards a member contacted by the cushion, said stiffening-strip consisting of a body of material having substantial rigidity to withstand edgewise pressure.

5. A weather-strip comprising a cushion formed of a plurality of longitudinal strands of wicking twisted together and compressed into a substantially cylindrical cross-section, a length of fabric having the portion intermediate its width surrounding said cushion and providing a form-retaining cover therefor, a row of stitches passing through the fabric adjacent the cushion, the edges of said fabric extending from said cushion providing a normally flexible multiple-ply flange disposed lateral to said cushion, and a relatively narrow stiffening strip united to said flange and disposed edgewise with respect to said cushion whereby the weather-strip is stiffened radially to the cushion and in a direction towards a member contacted by the cushion, said stiffening-strip consisting of a body of material having substantial rigidity to withstand edgewise pressure.

6. A weather-strip comprising a cushion formed of a plurality of longitudinal strands of wicking twisted together and compressed into a substantially cylindrical cross-section, a length of fabric having the portion intermediate its width surrounding said cushion and providing a form-retaining cover therefor, a row of stitches passing through the fabric adjacent the cushion, the edges of said fabric extending from said cushion providing a normally flexible multiple-ply flange disposed lateral to said cushion, and a relatively narrow stiffening strip secured to and forming a ply of said flange and disposed edgewise with respect to said cushion whereby the weather-strip is stiffened radially to the cushion and in a direction towards a member contacted by the cushion, said stiffening-strip consisting of a body of material having substantial rigidity to withstand edgewise pressure.

7. A weather-strip comprising a cushion formed of a plurality of longitudinal strands of wicking twisted together and compressed into a substantially cylindrical cross-section, a length of fabric having the portion intermediate its width surrounding said cushion and providing a form-retaining cover therefor, a row of stitches passing through the fabric adjacent the cushion, the edges of said fabric extending from said cushion providing a normally flexible multiple-ply flange disposed lateral to said cushion, and a relatively narrow stiffening strip forming a ply of said flange and disposed edgewise with respect to said cushion, and a row of stitches passing through all the plies of said flange adjacent the outer edge of the latter, whereby the weather-strip is stiffened radially to the cushion and in a direction towards a member contacted by the cushion, said stiffening-strip consisting of a body of material having substantial rigidity to withstand edgewise pressure.

8. A weather-strip comprising a cylindrical cushion of relatively soft material, a length of fabric the intermediate portion of which between its longitudinal edges provides a tubular envelop enclosing said cushion, a radial flange formed with plies of the margins of said envelop fabric, securing means passing through the fabric at the juncture of the flange and cushion, and a narrow stiffening strip interposed between the plies of the flange and anchored thereon along its inner edge by said securing means, the opposite edge of said stiffening strip being exposed, said stiffening-strip consisting of a body of material having substantial rigidity to withstand edgewise pressure.

9. A weather-strip comprising a cylindrical cushion of relatively soft material, a length of fabric the intermediate portion of which between its longitudinal edges provides a tubular envelop enclosing said cushion, a radial flange formed with plies of the margins of said envelop fabric said flange being open along its outer edge, securing means passing through the fabric at the juncture of the flange and cushion, and a narrow stiffening strip interposed between the plies of the flange and anchored therein along its inner edge by said securing means, the opposite edge of said stiffening strip being exposed, said stiffening-strip consisting of a body of material having substantial rigidity to withstand edgewise pressure.

10. A weather-strip comprising a cylindrical cushion of relatively soft material, a length of fabric the intermediate portion of which between its longitudinal edges provides a tubular envelop enclosing said cushion, a radial flange formed with two corresponding widths of the margins of said envelop fabric, securing means passing through the fabric at the juncture of the flange and cushion, and a narrow stiffening strip interposed between the plies of the flange and anchored therein along its inner edge by said securing means, the opposite edge of said stiffening strip being exposed, said stiffening-strip consisting of a body of material having substantial rigidity to withstand edgewise pressure.

11. A weather-strip comprising a cushion of soft material, a fabric cover enveloping said cushion and maintaining the same in normally cylindrical shape in cross-section, stitches passing through the fabric adjacent the edge of the cushion, and a flange extending radial to the cushion, said flange consisting of equal plies formed with the margins of the cover fabric and a relatively narrow stiffening strip interposed between said plies and anchored therein by said stitches, said stiffening-strip consisting of a body of material having substantial rigidity to withstand edgewise pressure.

12. A weather-strip comprising a length of relatively soft material of substantially cylindrical cross section to provide a cushion, a length of fabric having the portion intermediate its longitudinal edges surrounding said cushion, securing means passing through the fabric adjacent the cushion, a multiple-ply mounting flange formed of several plies of said fabric and disposed laterally from the cushion, and a narrow stiffening strip forming a ply of said flange and disposed edgewise relative to the axis of said cushion, the inner edge of the stiffening strip providing a longitudinal abutment whereby to compress the portion of the cushion lying beyond the edge of the stiffening strip between said abutment and a member opposing said cushion, said stiffening-strip consisting of a body of material having substantial rigidity to withstand edgewise pressure.

13. A weather-strip comprising a length of relatively soft material of substantially cylindrical cross section to provide a cushion, a length of fabric having the portion intermediate its longitudinal edges surrounding said cushion, securing means passing through the fabric adjacent the cushion, a multiple-ply mounting flange formed of several plies of said fabric and disposed laterally from the cushion, and a narrow stiffening strip a portion of which forms a ply of said flange, said stiffening strip being disposed in such position that it provides a longitudinal abutment to compress the cushion when the latter is engaged with an opposing member substantially opposite the abutment, said stiffening-strip consisting of a body of material having substantial rigidity to withstand edgewise pressure.

14. A weather-strip comprising a yieldable elongated cushion, a form-retaining cover therefor, and a mounting flange extending longitudinally of said cushion and formed of a plurality of plies of material one of which plies provides a stiffening strip, said stiffening strip consisting of a body of material having substantial rigidity to withstand edgewise pressure.

15. A weather-strip comprising a length of fabric overlapped and stitched intermediate its longitudinal edges to provide a pocket of substantially cylindrical cross-section and a flat hem extending laterally therefrom, cushioning material enclosed entirely within said pocket, and a flat strip of reinforcing material enclosed in said hem close to said pocket and having a longitudinal edge abutting said cushion and cylindrical pocket.

16. A weather-strip comprising an elongated yieldable cushion, a sheet of fabric forming a substantially cylindrical cover around said cushion, a longitudinal fin of fabric disposed lateral to said cushion, a substantially flat reinforcing strip enclosed within said fin close to and having a longitudinal edge disposed in abutting relation to said cushion, and common means spaced from the adjacent edge of said reinforcing strip for maintaining said reinforcing strip in said abutting position and for maintaining said covering fabric in substantially cylindrical formation around said cushion.

REGINALD B. CALCUTT.